US011334090B2

(12) United States Patent
Du et al.

(10) Patent No.: US 11,334,090 B2
(45) Date of Patent: May 17, 2022

(54) METHOD AND SYSTEM FOR DETERMINING AUTONOMOUS VEHICLE (AV) ACTION BASED ON VEHICLE AND EDGE SENSOR DATA (71) Applicant: GM GLOBAL TECHNOLOGY OPERATIONS LLC, Detroit, MI (US)

(72) Inventors: Jiang L. Du, Beaverton, OR (US); Fan Bai, Ann Arbor, MI (US); Wei Tong, Troy, MI (US); Donald K. Grimm, Utica, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 462 days.

(21) Appl. No.: 16/274,424

(22) Filed: Feb. 13, 2019

(65) Prior Publication Data
US 2020/0257310 A1   Aug. 13, 2020

(51) Int. Cl.
*H04W 4/46* (2018.01)
*G05D 1/02* (2020.01)
*G08G 1/16* (2006.01)
*G05D 1/00* (2006.01)

(52) U.S. Cl.
CPC ......... *G05D 1/0289* (2013.01); *G05D 1/0088* (2013.01); *G05D 1/0285* (2013.01); *G08G 1/163* (2013.01); *H04W 4/46* (2018.02); *G05D 2201/0213* (2013.01)

(58) Field of Classification Search
CPC .. G05D 1/0289; G05D 1/0088; G05D 1/0285; G05D 2201/0213; H04W 4/46; G08G 1/163
See application file for complete search history.

(56) References Cited

U.S. PATENT DOCUMENTS

2019/0068884 A1* 2/2019 Purkait ............... G05D 1/0088
2019/0391587 A1* 12/2019 Uvarov ................ G06K 9/22
2020/0097811 A1* 3/2020 Ma ..................... G06N 5/043

* cited by examiner

*Primary Examiner* — Mathew Franklin Gordon
(74) *Attorney, Agent, or Firm* — Lorenz & Kopf, LLP (57) ABSTRACT An autonomous vehicle (AV) perception system and method of determining an autonomous vehicle (AV) action for a host vehicle. The method includes: obtaining onboard vehicle sensor data from at least one onboard vehicle sensor, the onboard vehicle sensor is a part of vehicle electronics of the host vehicle; obtaining edge sensor data from at least one edge sensor, the edge sensor is a part of an edge layer; generating a unified perception output based on the onboard vehicle sensor data and the edge sensor data; determining an AV action for the host vehicle based on the unified perception output; and providing the AV action to the host vehicle, wherein the host vehicle is configured to carry out the AV action.

19 Claims, 5 Drawing Sheets

METHOD AND SYSTEM FOR DETERMINING AUTONOMOUS VEHICLE (AV) ACTION BASED ON VEHICLE AND EDGE SENSOR DATA

TECHNICAL FIELD

The present disclosure relates to autonomous vehicle systems, including those that utilize edge and/or cloud layers.

BACKGROUND

Vehicles include various electronic control units (ECUs) that carry out various tasks for the vehicle. Many vehicles now include various sensors to sense information concerning the vehicle's operation and/or the nearby or surrounding environment. Also, some roadways now include electronic computing systems that can communicate with nearby vehicles, and which may also include or be connected to roadside sensors.

Thus, it may be desirable to provide a system and/or method for determining an autonomous vehicle (AV) action for a host vehicle.

SUMMARY

According to one aspect, there is provided a method of determining an autonomous vehicle (AV) action for a host vehicle. The method includes the steps of: obtaining onboard vehicle sensor data from at least one onboard vehicle sensor, the onboard vehicle sensor is a part of vehicle electronics of the host vehicle; obtaining edge sensor data from at least one edge sensor, the edge sensor is a part of an edge layer; generating a unified perception output based on the onboard vehicle sensor data and the edge sensor data; determining an AV action for the host vehicle based on the unified perception output; and providing the AV action to the host vehicle, wherein the host vehicle is configured to carry out the AV action.

According to various embodiments, the method may further include any one of the following features or any technically-feasible combination of some or all of these features:

- the generating step further includes generating the unified perception output with an edge node of the edge layer;
- the generating step further includes generating the unified perception output by transforming at least one of the onboard vehicle sensor data or the edge sensor data to a homogenous coordinate system;
- an edge sensor data projection $T^S$ is generated using the edge sensor data as a part of the transforming step, the edge sensor data is represented as $S=\{s_1, s_2, \ldots, s_{ns}\}$, the edge sensor data projection is represented as $T^S=\{T_1^S, T_2^S, \ldots, T_{ns}^S\}$, and wherein the edge sensor data projection includes or represents the edge sensor data within the homogenous coordinate system;
- an onboard vehicle sensor data projection $T^{V_i}$ is generated using the onboard vehicle sensor data as a part of the transforming step, the onboard vehicle sensor data is represented as $V_i=\{v_{i1}, v_{i2}, \ldots, v_{in_i}\}$, the onboard vehicle sensor data projection is represented as $T^{V_i}=\{T_1^{V_i}, T_2^{V_i}, \ldots, T_{n_i}^{V_i}\}$, and wherein the onboard vehicle sensor data projection includes or represents the onboard vehicle sensor data within the homogenous coordinate system;
- the unified perception output includes a set of unique points $P=\{P_1, P_2, \ldots P_m\}$, and wherein the set of unique points includes or represents the edge sensor data projection $T^S$ and the onboard vehicle sensor data projection $T^{V_i}$;
- the set of unique points P includes onboard vehicle sensor data from one or more nearby vehicles other than the host vehicle;
- the method is carried out by the edge node, the edge node includes a processor, memory, and a wireless communications device, the edge node is communicatively coupled to the edge sensor, and the wireless communications device communicates with one or more nearby vehicles, including the host vehicle;
- the generating step further includes gathering geographical and/or spatial information regarding static objects from the edge node memory, and generating the unified perception output so as to include the geographical and/or spatial information, wherein the static objects are within an edge cell corresponding to the edge node;
- the method further comprises the step of determining whether to allocate one or more computational tasks relating to the determination of the AV action to a cloud layer and, when it is determined to allocate one or more computational tasks relating to the determination of the AV action to the cloud layer, sending task information to a cloud device of the cloud layer;
- the host vehicle is further configured to determine whether the AV action conflict with a vehicle-determined AV action and, if so, to carry out a minimum risk action;
- the unified perception output includes object information concerning one or more objects within a field of view of the at least one onboard vehicle sensor or the at least one edge sensor, and wherein the object information of the unified perception output is generated based on object detection techniques; and/or
- the host vehicle is configured to determine whether to allocate an AV-related task to an edge node of the edge layer, and wherein the edge node carries out the method steps and provides the AV action to the vehicle in response to completing the AV-related task.

According to another aspect, there is provided a method of determining an autonomous vehicle (AV) action for a host vehicle. The method includes the steps of: obtaining onboard vehicle sensor data from at least one onboard vehicle sensor, the onboard vehicle sensor is a part of vehicle electronics of the host vehicle; obtaining onboard vehicle sensor data from one or more other vehicles; determining whether to allocate a vehicle task to an edge layer; when it is determined to allocate the vehicle task to the edge layer, sending the onboard vehicle sensor data from the host vehicle to an edge node of the edge layer, wherein the edge node is configured to: (i) transform the onboard vehicle sensor data of the host vehicle and the onboard vehicle sensor data of the one or more other vehicles to a homogenous coordinate system; (ii) determine a unified perception output based on the transformed onboard vehicle sensor data; (iii) perform the vehicle task based on the unified perception output to obtain a vehicle task output; and (iv) send the vehicle task output to the host vehicle; receiving the vehicle task output at the host vehicle from the edge node; and carrying out an AV action based on the vehicle task output at the host vehicle.

According to various embodiments, the method may further include any one of the following features or any technically-feasible combination of some or all of these features:

the vehicle electronics includes short-range wireless communications (SRWC) circuitry, and wherein the sending the onboard vehicle sensor data step is carried out using the SRWC circuitry;

the determining step includes carrying out a hard-guaranteed scheduling process, and wherein the host vehicle is a low-level autonomous vehicle;

the hard-guaranteed scheduling process includes determining a quality of service (QoS) performance level, and wherein the QoS performance level includes a reliability metric, an accuracy metric, and a latency metric;

the edge node is further configured to determine whether to allocate the vehicle task or part of the vehicle task to a cloud layer and, when it is determined to allocate the vehicle task or part of the vehicle task to the cloud layer, then sending an indication to a cloud device of the cloud layer to perform the vehicle task or part of the vehicle task; and/or the vehicle task output indicates the AV action along with at least one AV parameter, and wherein the vehicle carries out the AV action according to the at least one AV parameter using an AV control unit of the vehicle electronics.

According to another aspect, there is provided an autonomous vehicle (AV) perception system, including: an edge layer and a vehicle layer. The edge layer includes at least one edge node and at least one edge sensor, the edge sensor is communicatively coupled to the at least one edge node, and the at least one edge node includes a processor, memory communicatively coupled to the processor, and a wireless communications device that is communicatively coupled to the processor. The vehicle layer includes a host vehicle, the host vehicle includes at least one onboard vehicle sensor, a wireless communications device, and an AV control unit. The edge layer and the vehicle layer are configured to: obtain onboard vehicle sensor data from the at least one onboard vehicle sensor of the host vehicle; obtain edge sensor data from the at least one edge sensor of the edge layer; generate a unified perception output based on the onboard vehicle sensor data and the edge sensor data; determine an AV action for the host vehicle based on the unified perception output; and provide the AV action to the host vehicle, wherein the host vehicle is configured to carry out the AV action using the AV control unit.

BRIEF DESCRIPTION OF THE DRAWINGS

One or more embodiments of the disclosure will hereinafter be described in conjunction with the appended drawings, wherein like designations denote like elements, and wherein.

DETAILED DESCRIPTION OF THE ILLUSTRATED EMBODIMENT(S)

The system and method below enable autonomous vehicles to utilize edge and cloud computing systems so as to facilitate and/or improve AV planning. The system generally includes three layers: a vehicle layer having one or more vehicles; an edge layer having one or more edge nodes; and a cloud layer having one or more cloud servers or systems. The vehicle can be a semi-autonomous or autonomous vehicle that includes one or more onboard vehicle sensors and an AV control unit. The vehicle can communicate with the edge node(s) and, in particular, can register or communicate with a particular edge node when entering or approaching an edge cell. An edge cell is a predetermined area or wireless operating range that is associated with an edge node and that is treated as a predetermined or discrete area for purposes of tracking and planning AV movement through the predetermined area.

According to one embodiment, the vehicle can determine to allocate a vehicle task to the vehicle layer, the edge layer, the cloud layer, or some combination thereof, and, when the vehicle determines to do so, onboard vehicle sensor data and/or other vehicle operating information can be sent to these respective systems. The edge node can combine or fuse a variety of sensor data from various sensors, such as onboard vehicle sensors from one or more vehicles and edge sensor data from an edge or roadside sensor, so as to generate a unified perception output. At least in one embodiment, the unified perception output includes a collection of sensor data mapped to a homogenous coordinate system, which enables each of the sensor data from the various sources to be analyzed and/or evaluated with respect to a common or shared coordinate system. This can be used to improve AV planning, as vehicle and other object trajectories can be predicted or determined with improved accuracy.

Also, information from the cloud layer can be used to supplement or adjust the unified perception output. For example, traffic and/or weather information can be obtained from one or more cloud servers, which can aid in making determinations as to the output of various vehicle tasks, such as which vehicle action is to be performed and the parameters of such action. Additionally, the cloud layer can be used to process certain tasks for use by the vehicle layer or the edge layer. In one embodiment, those tasks that are computationally intensive and/or that do not have stringent time constraints can be allocated to the cloud layer to obtain a task output, which can then be sent back to the requestor (or task allocator), which can be the host vehicle or the edge node.

Figure 1:
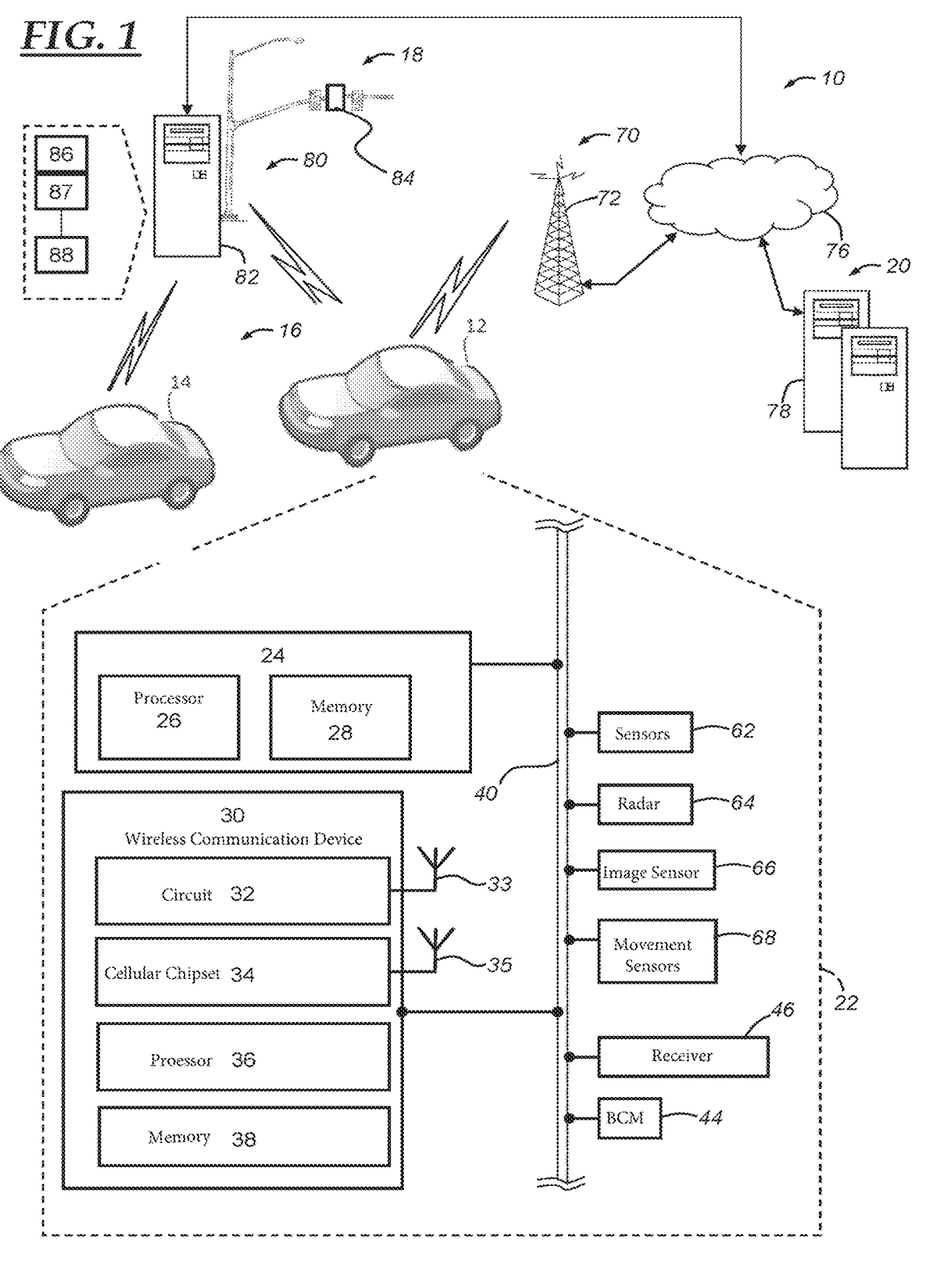
FIG. 1 is a block diagram depicting an embodiment of a communications system that is capable of utilizing the method disclosed herein.

FIG. 1 illustrates an operating environment that comprises a communications system 10 and that can be used to implement the method disclosed herein. Communications system 10 generally includes semi-autonomous or autonomous vehicles 12, 14 (which are part of a vehicle layer 16), an edge computing system (or "edge node") 80 (which are part of an edge layer 18), one or more wireless carrier systems 70, a land communications network 76, and remote computers or servers 78 (which are part of a cloud layer 20). As used herein, the terms "autonomous or semi-autonomous vehicles" or "AV" broadly mean any vehicle capable of automatically performing a driving-related action or function, without a driver request, and includes actions falling within levels 1-5 of the Society of Automotive Engineers (SAE) International classification system. A "low-level autonomous vehicle" is a level 1-3 vehicle, and a "high-level autonomous vehicle" is a level 4 or 5 vehicle. It should be understood that the disclosed method can be used with any number of different systems and is not specifically limited to the operating environment shown here. Thus, the following paragraphs simply provide a brief overview of one such communications system 10; however, other systems not shown here could employ the disclosed method as well.

The vehicle layer 16 may include one or more autonomous or semi-autonomous vehicles 12, 14 (e.g., the vehicle layer could include a plurality or a fleet of such vehicles), each of which is equipped with the requisite hardware and software needed to gather, process, and exchange data with other components of system 10. Although the vehicle 12 is described in detail below, that description also applies to the vehicle 14, which can include any of the components, modules, systems, etc. of the vehicle 12 unless otherwise noted or implied. According to a non-limiting example, vehicle 12 is an autonomous or semi-autonomous vehicle and includes vehicle electronics 22, which include an autonomous vehicle (AV) control unit 24, a wireless communications device 30, a communications bus 40, a body control module (BCM) 44, a global navigation satellite system (GNSS) receiver 46, and onboard vehicle sensors 62-68, as well as any other suitable combination of systems, modules, devices, components, hardware, software, etc. that are needed to carry out autonomous or semi-autonomous driving functionality. The various components of the vehicle electronics 22 may be connected by the vehicle communication network or communications bus 40 (e.g., a wired vehicle communications bus, a wireless vehicle communications network, or some other suitable communications network).

Skilled artisans will appreciate that the schematic block diagram of the vehicle electronics 22 is simply meant to illustrate some of the more relevant hardware components used with the present method and it is not meant to be an exact or exhaustive representation of the vehicle hardware that would typically be found on such a vehicle. Furthermore, the structure or architecture of the vehicle electronics 22 may vary substantially from that illustrated in FIG. 1. Thus, because of the countless number of potential arrangements and for the sake of brevity and clarity, the vehicle electronics 22 is described in conjunction with the illustrated embodiment of FIG. 1, but it should be appreciated that the present system and method are not limited to such.

Vehicle 12 is depicted in the illustrated embodiment as a sports utility vehicle (SUV), but it should be appreciated that any other vehicle including passenger cars, motorcycles, trucks, recreational vehicles (RVs), etc., can also be used. Portions of the vehicle electronics 22 are shown generally in FIG. 1 and include an autonomous vehicle (AV) control unit 24, a wireless communications device 30, a communications bus 40, a body control module (BCM) 44, a global navigation satellite system (GNSS) receiver 46, and onboard vehicle sensors 62-68. Some or all of the different vehicle electronics may be connected for communication with each other via one or more communication busses, such as communications bus 40. The communications bus 40 provides the vehicle electronics with network connections using one or more network protocols and can use a serial data communication architecture. Examples of suitable network connections include a controller area network (CAN), a media oriented system transfer (MOST), a local interconnection network (LIN), a local area network (LAN), and other appropriate connections such as Ethernet or others that conform with known ISO, SAE, and IEEE standards and specifications, to name but a few.

Although FIG. 1 depicts some exemplary electronic vehicle devices, the vehicle 12 can also include other electronic vehicle devices in the form of electronic hardware components that are located throughout the vehicle and, which may receive input from one or more sensors and use the sensed input to perform diagnostic, monitoring, control, reporting, and/or other functions. An "electronic vehicle device" is a device, module, component, unit, or other part of the vehicle electronics 22. Each of the electronic vehicle devices (e.g., AV control unit 24, the wireless communications device 30, BCM 44, GNSS receiver 46, sensors 62-68) can be connected by communications bus 40 to other electronic vehicle devices of the vehicle electronics 22, and may be programmed to run vehicle system and subsystem diagnostic tests. Moreover, each of the electronic vehicle devices can include and/or be communicatively coupled to suitable hardware that enables intra-vehicle communications to be carried out over the communications bus 40; such hardware can include, for example, bus interface connectors and/or modems. Also, any one or more of the electronic vehicle devices can be a stand-alone module or incorporated into another module or device, and any one or more of the devices can include their own processor and/or memory, or may share a processor and/or memory with other devices. As is appreciated by those skilled in the art, the above-mentioned electronic vehicle devices are only examples of some of the devices or modules that may be used in vehicle 12, as numerous others are also possible.

The autonomous vehicle (AV) control unit 24 is a controller that helps manage or control autonomous vehicle operations, and that can be used to perform AV logic (which can be embodied in computer instructions) for carrying out the AV operations. The AV control unit 24 includes a processor 26 and memory 28, which can include any of those types of processor or memory discussed below. The AV control unit 24 can be a separate and/or dedicated module that performs AV operations, or may be integrated with one or more other electronic vehicle devices of the vehicle electronics 22. The AV control unit 24 is connected to the communications bus 40 and can receive information from one or more onboard vehicle sensors or other electronic vehicle devices, such as the BCM 44 or the GNSS receiver 46. In one embodiment, the vehicle is a fully autonomous vehicle. And, in other embodiments, the vehicle may be a semi-autonomous vehicle.

The AV control unit 24 may be a single module or unit or a combination of modules or units. For instance, AV control unit 24 may include the following sub-modules (whether they be hardware, software or both): a perception sub-module, a localization sub-module, and/or a navigation sub-module. The particular arrangement, configuration and/or architecture of the AV control unit 24 is not important, so long as the module helps enable the vehicle to carry out autonomous and/or semi-autonomous driving functions. The AV control unit 24 can be indirectly or directly connected to vehicle sensors 62-68, as well as any combination of the other electronic vehicle devices 30, 44, 46 (e.g., via communications bus 40).

Wireless communications device 30 provides the vehicle with short range and/or long range wireless communication capabilities so that the vehicle can communicate and exchange data with other devices or systems that are not a part of the vehicle electronics 22, such as the remote computers and servers 78. In the illustrated embodiment, the wireless communications device 30 includes a short-range wireless communications (SRWC) circuit 32, a cellular chipset 34, a processor 36, and memory 38. The SRWC circuit 32 enables short-range wireless communications with any number of nearby devices (e.g., Bluetooth™, other IEEE 802.15 communications, Wi-Fi™, vehicle-to-vehicle (V2V) communications, vehicle-to-infrastructure (V2I) communications, other IEEE 802.11 communications, etc.). The cellular chipset 34 enables cellular wireless communications, such as those used with wireless carrier system 70. The wireless communications device 30 also includes antennas 33 and 35 that can be used to transmit and receive these wireless communications. The wireless communications device 30 also includes a processor 36 and memory 38. Although the SRWC circuit 32 and the cellular chipset 34 are illustrated as being a part of a single device, in other embodiments, the SRWC circuit 32 and the cellular chipset 34 can be a part of different modules—for example, the SRWC circuit 32 can be a part of an infotainment unit and the cellular chipset 34 can be a part of a telematics unit that is separate from the infotainment unit.

Body control module (BCM) 44 can be used to control various electronic vehicle devices or components of the vehicle, as well as obtain information concerning the electronic vehicle devices, including their present state or status, which can be in the form of or based on onboard vehicle sensor data. In one embodiment, the BCM 44 can receive onboard vehicle sensor data from sensors 62-68, as well as other vehicle sensors not explicitly discussed herein. The BCM 44 can send the onboard vehicle sensor data to one or more other electronic vehicle devices, such as AV control unit 24 and/or wireless communications device 30. In one embodiment, the BCM 44 may include a processor and memory accessible by the processor.

Global navigation satellite system (GNSS) receiver 46 receives radio signals from a plurality of GNSS satellites. The GNSS receiver 46 can be configured to comply with and/or operate according to particular regulations or laws of a given geopolitical region (e.g., country). The GNSS receiver 46 can be configured for use with various GNSS implementations, including global positioning system (GPS) for the United States, BeiDou Navigation Satellite System (BDS) for China, Global Navigation Satellite System (GLONASS) for Russia, Galileo for the European Union, and various other navigation satellite systems. The GNSS receiver 46 can include at least one processor and memory, including a non-transitory computer readable memory storing instructions (software) that are accessible by the processor for carrying out the processing performed by the receiver 46. The GNSS receiver 46 may be used to provide navigation and other position-related services to the vehicle operator. The navigation services can be provided using a dedicated in-vehicle navigation module (which can be part of GNSS receiver 46 and/or incorporated as a part of wireless communications device 30 or other part of the vehicle electronics 22), or some or all navigation services can be done via the wireless communications device (or other telematics-enabled device) installed in the vehicle, wherein the position information is sent to a remote location for purposes of providing the vehicle with navigation maps, map annotations (points of interest, restaurants, etc.), route calculations, and the like.

Sensors 62-68 are onboard vehicle sensors that can capture or sense information, which can then be sent to one or more other electronic vehicle devices. The onboard vehicle sensor data obtained by the sensors 62-68 can be associated with a time indicator (e.g., timestamp), as well as other metadata or information. The onboard vehicle sensor data can be obtained by the sensor 62-68 in a raw format, and may be processed by the sensor, such as for purposes of compression, filtering, and/or other formatting, for example. Moreover, the onboard vehicle sensor data (in its raw or formatted form), can be sent to one or more other electronic vehicle devices via communications bus 40, such as to the AV control unit 24 and/or to the wireless communications device 30. In at least one embodiment, the wireless communications device 30 can package the onboard vehicle sensor data for wireless transmission and send the onboard vehicle sensor data to other systems or devices, such as roadside unit (RSU) 82 of the edge layer 18 and/or remote computer or server(s) 78 of the cloud layer 20.

Lidar unit 62 is an electronic vehicle device of the vehicle electronics 22 that includes a lidar emitter and a lidar receiver. The lidar unit 62 can emit non-visible light waves for purposes of object detection. The lidar unit 62 operates to obtain spatial or other physical information regarding one or more objects within the field of view of the lidar unit 62 through emitting light waves and receiving the reflected light waves. In many embodiments, the lidar unit 62 emits a plurality of light pulses (e.g., laser light pulses) and receives the reflected light pulses using a lidar receiver. The lidar unit 62 may be mounted (or installed) on the front of the vehicle 12. In such an embodiment, the lidar unit 62 can face an area in front of the vehicle 12 such that the field of view of the lidar unit 62 includes this area. The lidar unit 62 can be positioned in the middle of the front bumper of the vehicle 12, to the side of the front bumper, on the sides of the vehicle 12, on the rear of the vehicle 12 (e.g., a rear bumper), etc. And, although only a single lidar unit 62 is depicted in the illustrated embodiment, the vehicle 12 can include one or more lidar units. Moreover, the lidar data captured by the lidar unit 62 can be represented in a pixel array (or other similar visual representation). The lidar unit 62 can capture static lidar images and/or lidar image or video streams.

Radar unit 64 is an electronic vehicle device of the vehicle electronics 22 that uses radio waves to obtain spatial or other physical information regarding one or more objects within the field of view of the radar 64. The radar 64 includes a transmitter that transmits electromagnetic radio waves via use of a transmitting antenna and can include various electronic circuitry that enables the generation and modulation of an electromagnetic carrier signal. In other embodiments, the radar 64 can transmit electromagnetic waves within another frequency domain, such as the microwave domain. The radar 64 includes a signal processor, which can at least partially (e.g., fully) be implemented using the processor discussed above, or which may at least partially (e.g., fully) be implemented with dedicated circuitry. The radar 64 can include a separate receiving antenna, or the radar 64 can include a single antenna for both reception and transmission of radio signals. And, in other embodiments, the radar 64 can include a plurality of transmitting antennas, a plurality of receiving antennas, or a combination thereof so as to implement multiple input multiple output (MIMO), single input multiple output (SIMO), or multiple input single output (MISO) techniques. Although a single radar 64 is shown, the vehicle 12 can include one or more radars that can be mounted at the same or different locations of the vehicle 12.

Vehicle camera(s) 66 are mounted on vehicle 12 and may include any suitable system known or used in the industry. According to a non-limiting example, vehicle 12 includes a collection of CMOS cameras or image sensors 66 located around the vehicle, including a number of forward-facing CMOS cameras that provide digital images that can be subsequently stitched together to yield a 2D or 3D representation of the road and environment in front and/or to the side of the vehicle. The vehicle camera 66 may provide vehicle video data to one or more components of the vehicle electronics 22, including to the wireless communications device 30 and/or the AV control unit 24. Depending on the particular application, the vehicle camera 66 may be: a still camera, a video camera, and/or some other type of image generating device; a BW and/or a color camera; a front-, rear- side- and/or 360°-facing camera; part of a mono and/or stereo system; an analog and/or digital camera; a short-, mid- and/or long-range camera; and a wide and/or narrow FOV (aperture angle) camera, to cite a few possibilities. In one example, the vehicle camera 66 outputs raw vehicle video data (i.e., with no or little pre-processing), whereas in other examples the vehicle camera 66 includes image processing resources and performs pre-processing on the captured images before outputting them as vehicle video data.

The movement sensors 68 can be used to obtain movement or inertial information concerning the vehicle, such as vehicle speed, acceleration, yaw (and yaw rate), pitch, roll, and various other attributes of the vehicle concerning its movement as measured locally through use of onboard vehicle sensors. The movement sensors 68 can be mounted on the vehicle in a variety of locations, such as within an interior vehicle cabin, on a front or back bumper of the vehicle, and/or on the hood of the vehicle 12. The movement sensors 68 can be coupled to various other electronic vehicle devices directly or via the communications bus 40. Movement sensor data can be obtained and sent to the other electronic vehicle devices, including AV control unit 24, BCM 44, and/or wireless communications device 30.

In one embodiment, the movement sensors 68 can include wheel speed sensors, which can be installed into the vehicle as an onboard vehicle sensor. The wheel speed sensors are each coupled to a wheel of the vehicle 12 and that can determine a rotational speed of the respective wheel. The rotational speeds from various wheel speed sensors can then be used to obtain a linear or transverse vehicle speed. Additionally, in some embodiments, the wheel speed sensors can be used to determine acceleration of the vehicle. In some embodiments, wheel speed sensors can be referred to as vehicle speed sensors (VSS) and can be a part of an anti-lock braking (ABS) system of the vehicle 12 and/or an electronic stability control program. As discussed more below, the electronic stability control program can be embodied in a computer program or application that can be stored on a non-transitory, computer-readable memory (such as that which is included in memory of the AV control unit 24 or memory 38 of the wireless communications device 30). The electronic stability control program can be executed using a processor of AV control unit 24 (or processor 36 of the wireless communications device 30) and can use various sensor readings or data from a variety of vehicle sensors including sensor data from sensors 62-68.

Additionally or alternatively, the movement sensors 68 can include one or more inertial sensors, which can be installed into the vehicle as an onboard vehicle sensor. The inertial sensor(s) can be used to obtain sensor information concerning the acceleration and the direction of the acceleration of the vehicle. The inertial sensors can be microelectromechanical systems (MEMS) sensor or accelerometer that obtains inertial information. The inertial sensors can be used to detect collisions based on a detection of a relatively high deceleration. When a collision is detected, information from the inertial sensors used to detect the collision, as well as other information obtained by the inertial sensors, can be sent to the wireless communication device 30 (or other central vehicle computer of the vehicle). Additionally, the inertial sensor can be used to detect a high level of acceleration or braking. In one embodiment, the vehicle 12 can include a plurality of inertial sensors located throughout the vehicle. And, in some embodiments, each of the inertial sensors can be a multi-axis accelerometer that can measure acceleration or inertial force along a plurality of axes. The plurality of axes may each be orthogonal or perpendicular to one another and, additionally, one of the axes may run in the direction from the front to the back of the vehicle 12. Other embodiments may employ single-axis accelerometers or a combination of single- and multi-axis accelerometers. Other types of sensors can be used, including other accelerometers, gyroscope sensors, and/or other inertial sensors that are known or that may become known in the art.

The movement sensors 68 can include one or more yaw rate sensors, which can be installed into the vehicle as an onboard vehicle sensor. The yaw rate sensor(s) can obtain vehicle angular velocity information with respect to a vertical axis of the vehicle. The yaw rate sensors can include gyroscopic mechanisms that can determine the yaw rate and/or the slip angle. Various types of yaw rate sensors can be used, including micromechanical yaw rate sensors and piezoelectric yaw rate sensors.

The movement sensors 68 can also include a steering wheel angle sensor, which can be installed into the vehicle as an onboard vehicle sensor. The steering wheel angle sensor is coupled to a steering wheel of vehicle 12 or a component of the steering wheel, including any of those that are a part of the steering column. The steering wheel angle sensor can detect the angle that a steering wheel is rotated, which can correspond to the angle of one or more vehicle wheels with respect to a longitudinal axis of vehicle 12 that runs from the back to the front. Sensor data and/or readings from the steering wheel angle sensor can be used in the electronic stability control program that can be executed on a processor of AV control unit 24 or processor 36 of the wireless communications device 30.

Wireless carrier system 70 may be any suitable cellular telephone system. Carrier system 70 is shown as including a cellular tower 72; however, the carrier system 70 may include one or more of the following components (e.g., depending on the cellular technology): cellular towers, base transceiver stations, mobile switching centers, base station controllers, evolved nodes (e.g., eNodeBs), mobility management entities (MMEs), serving and PGN gateways, etc., as well as any other networking components required to connect wireless carrier system 70 with the land network 76 or to connect the wireless carrier system with user equipment (UEs, e.g., which can include telematics equipment in vehicle 12). Carrier system 70 can implement any suitable communications technology, including GSM/GPRS technology, CDMA or CDMA2000 technology, LTE technology, etc. In general, wireless carrier systems 70, their components, the arrangement of their components, the interaction between the components, etc. is generally known in the art.

Land network 76 may be a conventional land-based telecommunications network that is connected to one or more landline telephones and connects wireless carrier system 70 to remote computer 78. For example, land network 76 may include a public switched telephone network (PSTN) such as that used to provide hardwired telephony, packet-switched data communications, and the Internet infrastructure. One or more segments of land network 76 could be implemented through the use of a standard wired network, a fiber or other optical network, a cable network, power lines, other wireless networks such as wireless local area networks (WLANs), networks providing broadband wireless access (BWA), or any combination thereof. The land network 76 and/or the wireless carrier system 70 can be used to communicatively couple the cloud layer 20 with the edge layer 18 and/or the vehicle layer 16.

Edge layer 18 is part of system 10 and may include any suitable combination of hardware, firmware, software, etc. needed to communicate with the vehicle and cloud layers 16, 20 and to help carry out the method described herein. For instance, the edge layer 18 may include various combinations of servers, routers, switches, processing units (e.g., central processing units (CPUs)), circuits (e.g., application specific integrated circuits (ASICs)), data storage devices, etc. that are needed to carry out various edge computing and other tasks required by the present method. The edge layer is also referred to as the "mobile edge computing (MEC) layer" or "fog layer," and these terms may be used interchangeably throughout the present application. The edge layer 18 includes a plurality of edge nodes 80 (one shown), which each includes one or more roadside units (RSUs) 82 and one or more edge sensors 84. The edge node 80 can be associated with or dedicated to processing information pertaining to a particular edge cell, which is a predetermined or predefined location nearby the edge node 80. Also, although the present disclosure discusses embodiments where an edge node 80 is associated with an edge cell, it should be appreciated that the edge node(s) may correspond to edge cell(s) according to various types of relationships—for example, a one-to-one relationship, a many-to-one relationship, a one-to-many relationship, or a many-to-many relationship. The edge node 80 (e.g., RSUs 82) can include a processor 87 and memory 86, as well as a wireless communications device 88, which can include a wireless transmitter and a wireless receiver. The wireless communications device can include circuitry to enable SRWCs, such as IEEE 802.11, 802.15, etc. The edge node 80 and RSU 82 is illustrated as being hardwired to land network 76, but in other embodiments, the edge node 80 and RSU 82 can include a cellular chipset similar to chipset 34 of the wireless communications device 30 of the vehicle 12.

The RSU 82 can be provided along or near a roadway, and can be used to control traffic signal(s), obtain traffic data, or perform other edge or fog layer processing for a roadway system. The RSU 82 (or other part of the edge node 80) can also be communicatively coupled to one or more edge sensors 84, which can be sensing devices that are configured to obtain sensor information concerning one or more roadways and/or one or more roadway entities (e.g., vehicles, bicycles, pedestrians). For example, the edge sensor 84 can be a lidar unit, a radar unit, and/or a camera, which can be similar to sensors 62-66 of vehicle 12. Although only a single edge sensor 84 is shown, the edge node 80 would likely include a variety of sensors that obtain information concerning one or more roadways surrounding the vehicle 12, such as one or more lidar units, one or more radar units, and/or one or more cameras. The RSU 82 can communicate with one or more nearby vehicles (e.g., vehicles 12, 14) via use of short-range wireless communications (SRWCs), so as to enable the vehicle layer 16 and the edge layer 18 to exchange information therebetween. The RSU 82 or other devices of the edge layer 18 can also be connected to the cloud layer 20 such that information can be shared or sent to the cloud layer 20 from the edge layer 18, and vice versa.

Cloud layer 20 is part of system 10 and may include any suitable combination of hardware, firmware, software, etc. needed to communicate with the vehicle and edge layers 16, 18 and to carry out the method described herein. The cloud layer 20 may include various combinations of servers, routers, switches, processing units (e.g., central processing units (CPUs)), circuits (e.g., application specific integrated circuits (ASICs)), data storage devices, etc. that are needed to carry out different tasks associated with vehicle scene reconstruction, as well as other autonomous vehicle tasks.

The cloud layer 20 is illustrated as including computer(s) and/or server(s) 78. The computers 78 (only one shown in FIG. 1) can be used for one or more purposes, such as for providing backend autonomous services for one or more vehicles. The computers 78 can be some of a number of computers accessible via a private or public network such as the Internet. The computer(s) or server(s) 78 can each include a processor and memory, and can be used to provide various information to the vehicles 12, 14, as well as to edge layer 18. Moreover, the edge layer 18 and/or vehicle layer 16 can allocate tasks to be performed by the cloud layer 20, which can then perform the tasks and send result(s) to the edge layer 18 and/or vehicle layer 16, as discussed in more detail below. Because of the widespread knowledge in the art of edge and cloud layer architectures, and because the present method and system are not intended to be confined to any particular architecture or arrangement and can be used with a wide range of such architectures, additional detailed descriptions of the edge and cloud layers 18, 20 have been omitted.

Figure 2:
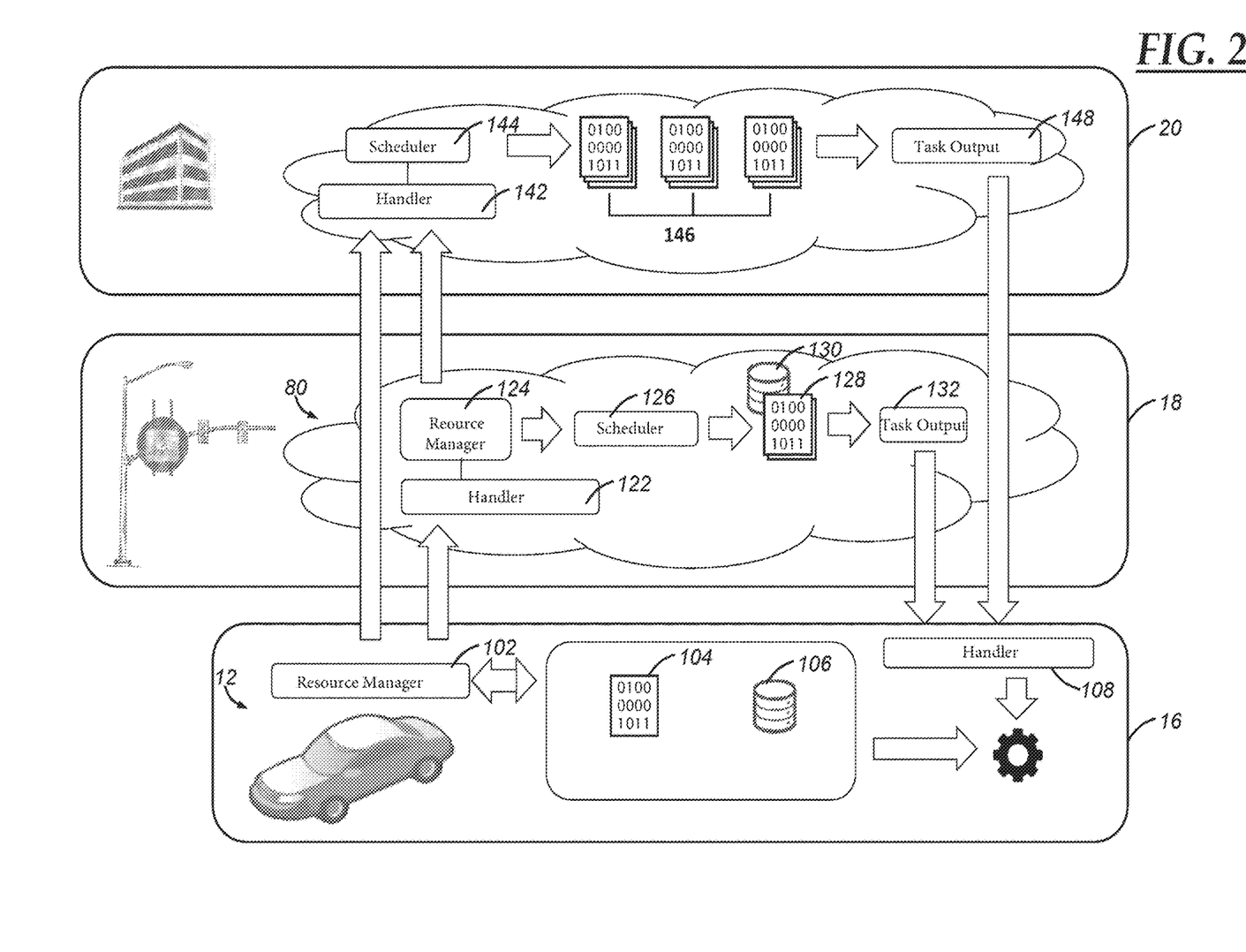
FIG. 2 is a block diagram depicting a detailed embodiment of certain components of the communications system of FIG. 1.

With reference to FIG. 2, there is shown a detailed portion of certain parts of the communications system 10, which illustrates communications and various processing of the vehicle layer 16, the edge layer 18, and the cloud layer 20. In general, at the vehicle layer 16, the vehicle 12 can include a resource manager 102, a processing system 104, a sensing and perception system 106, and a receive handler 108. The resource manager 102 can determine one or more tasks that are to be performed, and can then direct execution of the one or more tasks to the vehicle 12 (e.g., processing system 104), the edge layer 18, or the cloud layer 20, as illustrated by the arrows in FIG. 2. The resource manager 102, the processing system 104, the sensing and perception system 106, and the receive handler 108 can be embodied in one or more electronic vehicle devices of the vehicle electronics 22, such as the AV control unit 24. In addition to determining which task(s) are to be performed at which layer (e.g., the vehicle layer 16, the edge layer 18, the cloud layer 20), the vehicle 12 (or resource manager 102) can determine what information is to be provided to certain devices, systems, or layers. For example, when a task is designated to the edge layer 18, the resource manger 102 can send relevant sensor information to the edge layer 18.

When it is determined that a task is to be carried out at the vehicle 12, the vehicle can carry out the task using the processing system 104. The processing system 104 can be a part of one or more electronic vehicle devices, such as AV control unit 24, wireless communications device 30, or another onboard computing system of the vehicle 12. In some embodiments, the processing system 104 can obtain information from one or more onboard vehicle sensors, such as sensors 62-68. The sensing and perception system 106 can be used to obtain and initially process the onboard vehicle sensor data, which can then be sent to the processing system 104 and/or other devices, such as those at edge layer 18 and/or cloud layer 20. In one embodiment, the processing system 104 and the sensing and perception system 106 share the same electronic vehicle devices or components of the vehicle electronics 22. In other embodiments, these systems may be separate and/or carried out by different electronic vehicle devices of the vehicle electronics 22.

When it is determined that a task is to be carried out by the edge layer 18, the vehicle 12 can send information to the edge layer 18 (or a particular edge node 80) indicating that a task is to be performed at the edge layer 18. In some embodiments, the vehicle 12 can send a request for carrying out a task. The vehicle 12 can also send relevant information to the edge layer 18, such as raw or processed onboard vehicle sensor data and/or other vehicle state information, including location and/or trajectory information (e.g., as determined using GNSS receiver 46, for example). The edge layer 18 can receive this allocated task information (e.g., including the indicator, request for a task to be performed, and/or relevant task information) at the receive handler 122. In one embodiment, these communications between the edge layer 18 and the vehicle layer 16 are carried out using SRWCs, such as through use of SRWC circuit 32 of the wireless communications device 30 of the vehicle 12. In some embodiments, the vehicle can provide sensor information to the edge node 80 even when a certain task is not being allocated to the edge node 80. This enables the edge node 80 to use the vehicle's onboard vehicle sensor data so as to assist in the AV performance of other vehicles. For example, the vehicle 14 can provide sensor information to the edge node 80 even in embodiments where the vehicle 14 may not be an autonomous vehicle or allocating tasks to the edge node 80.

Once the wireless communications are received by the receive handler 122, the edge node 80 can determine whether to perform the task, and/or whether to allocate the task (or certain sub-tasks thereof) to the cloud layer 20. As illustrated, the edge node 80 includes the receive handler 122, a resource manager 124, a scheduler 126, a processing system 128, and a sensing and perception system 130. Any one or more of these modules or systems can be carried out by one or more electronic computing devices, such as the RSU(s) 82. Moreover, in some embodiments, the edge node 80 can communicate with other edge nodes, such as neighbor edge nodes where the corresponding edge cells are geographically adjacent to the edge node 80. The resource manager 124 is similar to the resource manager 102 of the vehicle layer 16 in that it can be used to determine which layer (or device) to allocate task(s) to. The scheduler 126 can be used to organize incoming (or to-be-performed) tasks and to distribute the tasks to certain parts of the edge layer 18 so as to process the tasks effectively. For example, a first task and a second task may be passed to the scheduler, and the second task may include a requirement that it be performed within 10 ms (or other predetermined time period) whereas the first task does not include such restrictive timeline. Thus, even though the second task was received at the scheduler (or edge layer 18) later than the first task, the second task may be sent to the processing system 128 before the first task.

The processing system 128 can be used to carry out the task(s), which can result in a task output 132. In one embodiment, the task can be carried out based on information received from the vehicle 12, along with other information obtained at the edge layer 18. For example, the vehicle 12 can send onboard vehicle sensor data to the edge node 80, and the edge node 80 can use sensor information obtained from edge sensor 84 to generate a unified perception output that more accurately and/or wholly represents the state of an area surrounding the vehicle 12 or nearby roadways, as discussed more below. In another embodiment, the edge node 80 can receive information from other vehicles, such as vehicle 14, and then process the task(s) using this other vehicle information so as to improve or supplement a task result or output. Also, in one embodiment, the edge node 80 can generate a unified perception output, and then use the unified perception output to carry out one or more AV-related tasks to produce an AV task output, which can be an AV action or command that is sent to the vehicle 12.

The sensing and perception system 130 can be used to obtain and initially process the edge sensor data (i.e., sensor data from the edge sensor(s) 84), which can then be sent to the processing system 128 and/or other devices. The sensing and perception system 130 can also be used to combine onboard vehicle sensor data and edge sensor data so as to provide a unified perception output that more accurately and/or wholly represents the state of an area surrounding the vehicle 12 or nearby roadways. The unified perception output can be or represent sensor data from two or more sensors, wherein at least two of the sensors are heterogeneous. Two sensors are considered heterogeneous when the two sensors provide sensor data that is in a different format (e.g., different types of encoding for the sensor data), that uses different reference points or coordinate systems, that uses different standards of measure or unit systems (e.g., imperial, metric), or that otherwise needs to be transformed, mapped, or processed so as to provide a unified perception of the relevant area. That is, the vehicle sensor data and the edge sensor data can be combined and processed so that a single unified perception output is produced. In one embodiment, the unified perception output is a geographical and/or spatial representation of one or more objects as informed through sensor data from two or more sensors. This unified perception output can then be used to carry out one or more tasks, and/or can be provided to the cloud layer 20 and/or the vehicle layer 16. In the event that the result of the tasks performed by the edge layer 18 is sent to the vehicle 12, it is received at the vehicle 12 using the receive handler. The receive handler 108 can be used to handle incoming results or information sent by the edge node 80 (or other edge layer device) and/or the cloud layer 20. This handling can include formatting (or otherwise processing) the received information, as well as directing the received information to the appropriate electronic vehicle device of the vehicle electronics 22.

The cloud layer 20 includes a receive handler 142, a scheduler 144, and a processing system 146. Any one or more of these components can be carried out by one or more electronic computing devices located remotely from the vehicle 12. Each of these one or more electronic computing devices, such as computers and/or servers 78, can include a processor and memory, and may be included as a part of a larger server system. The receive handler 142 is similar to the receive handler 122 of the edge layer 18, and can handle incoming messages or requests from vehicle layer 16 and edge layer 18. The scheduler 144 is similar to the scheduler 126 of the edge layer 18, and can be used to schedule the performance of various tasks received from the vehicle layer 16 and/or the edge layer 18. The processing system 146 of the cloud layer 20 can be used to carry out one or more tasks to obtain a task output 148, which can then be sent back to the edge layer 18 and/or the vehicle layer 16. The output of these processed tasks, which is referred to as the task output, can then be used to carry out one or more vehicle actions, such as one or more autonomous vehicle operations. In one embodiment, the task output can be an AV operation command that commands the vehicle to perform a particular AV operation.

Figure 3:
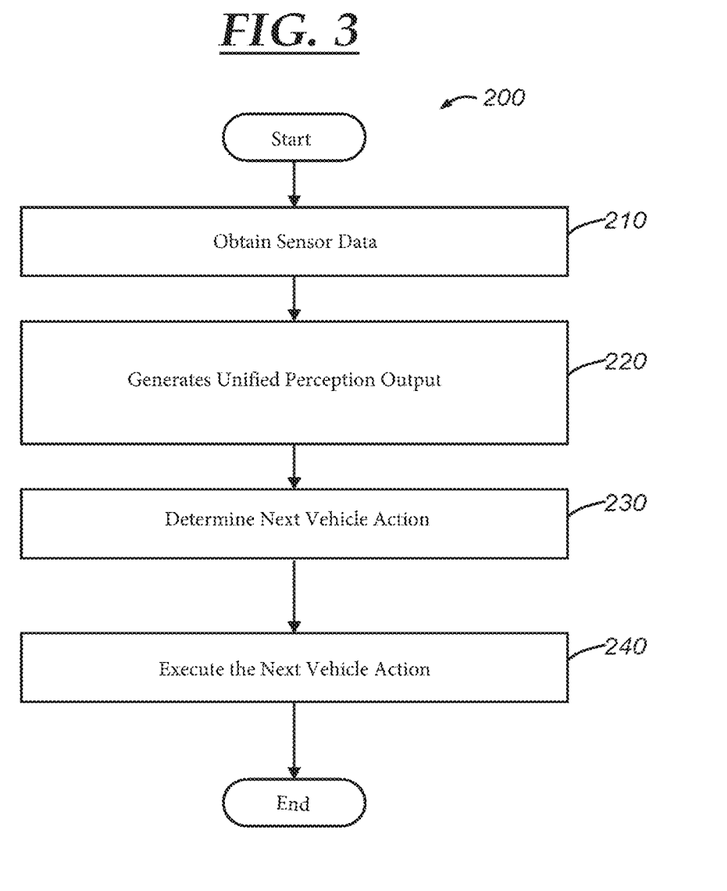
FIG. 3 is a flowchart depicting an embodiment of a method of determining an autonomous vehicle (AV) action for a host vehicle.

With reference to FIG. 3, there is shown a flow chart depicting an exemplary method 200 of determining and, at least partially carrying out, an autonomous vehicle (AV) action based on a unified perception of a surrounding area. The method 200 can be carried out by any of, or any combination of, the components of system 10, including the following: the vehicle layer 16 (e.g., the host vehicle 12), the edge layer 18, and the cloud layer 20. In one embodiment, the steps 210-230 are carried out by a combination of the vehicle 12 and the edge layer 18, and step 240 is carried out by the vehicle 12.

In step 210, sensor data is obtained by a perception system. The perception system is a system or module that takes sensor signals as input and then outputs a unified perception output. The unified perception output represents objects within the surrounding area of the vehicle, and includes physical properties of the one or more objects. The one or more objects can be any object that is within the surrounding area, such as other vehicles on the road (e.g., vehicle 14), obstacles in the road, pedestrians, bicycles, lane markings, traffic signs, traffic signals, etc. The physical properties of the one or more objects that can be identified and represented as a part of the unified perception output can include location, distance, heading, speed, size, geometry, type of object, orientation, color, etc.

The perception system can include devices or components located at either or both of the vehicle layer 16 and the edge layer 18. In some embodiments, the perception system can further include devices or components of the cloud layer 20. In one embodiment, the perception system is located at the edge layer 18, and can include the sensing and perception system 130. In another embodiment, the perception system is located at the vehicle layer 16, and can include the sensing and perception system 106. And, in another embodiment, the perception system is located at both the vehicle layer 16 and the edge layer 18.

Thus, in step 210, sensor data can be obtained from one or more of the vehicle sensor(s) 62-68 (or other sensors not illustrated) and/or from one or more edge sensors 84. For example, vehicle sensor data can be obtained by sensors 62-68, sent to the wireless communications device 30 via the communications bus 40, and then to the edge sensing and perception system 130. This sensor data from the vehicle can be accompanied by (or included in a message with) a request to perform a task, which can be to provide a unified perception output, a recommended vehicle action (e.g., a recommended AV action), or a vehicle command (e.g., a command to perform a particular vehicle action). A recommended vehicle action and a vehicle command can be referred to collectively as a vehicle action. The method 200 continues to step 220.

In step 220, the method generates a unified perception output based on sensor data. As mentioned above, the perception system 106, 130 can be used to obtain a unified perception output, which can represent information concerning one or more objects surrounding the vehicle. Sensor information can be obtained from the onboard vehicle sensors 62-68, as well as from the edge sensors 84. Each of the sensor data from each of these sensors may be formatted in a different way, may be based on different anchor points (or reference information), and/or may otherwise be obtained in a different context or under different conditions. Thus, in one embodiment, the perception system 106, 130 is used to universalize (or standardize) the sensor information from the various sensors. In one example, this can include transforming, mapping, or otherwise processing the sensor data so that the sensor data corresponds to a homogenous coordinate system. The homogenous coordinate system is a coordinate system to which sensor information from various sensors (e.g., sensors 62-68, 84, etc.) can be mapped so that the sensor information from the various sensors can be viewed or described with reference to a shared or common coordinate system. The sensor data (e.g., the edge sensor data, the onboard vehicle sensor data) can be received at the perception system in a raw format or in a processed (or formatted) state. The perception system can extract the sensor data from the formatted sensor data and generate the unified perception output.

Also, in one embodiment, when generating the unified perception output, the perception system can gather certain geographical and/or spatial information regarding static objects or the geographical area within the edge cell. For example, the elevation, latitude, longitude, size, and other physical properties of one or more static objects within the field of view may be stored in memory accessible to the perception system. In one embodiment, the perception system is part of an edge node or edge computing system that includes memory with this physical property information. The presence of a particular static object in the field of view of onboard vehicle sensor data can inform the perception system of how to merge or unify the onboard perception data with the edge sensor data as well as other onboard vehicle sensor data from other (non-host) vehicles, like vehicle 14.

In one embodiment, the edge (or infrastructure-based) sensor data can be represented as $S=\{s_1, s_2, \ldots, s_{ns}\}$, where ns is the number of edge sensors, and a corresponding projection $T^S$ of the edge (or infrastructure-based) sensor data to the homogenous coordinate system is represented as $T^S=\{T_1^S, T_2^S, \ldots, T_{ns}^S\}$. Likewise onboard vehicle sensor data from the ith vehicle can be represented as $V_i=\{v_{i1}, v_{i2}, \ldots, v_{in_i}\}$, $i=1, \ldots N$, where N is total number of vehicles and $n_i$ is the total number of the sensors of the ith vehicle. A corresponding projection $T^{V_i}$ of the vehicle onboard vehicle sensor data to the homogenous coordinate system is represented as $T^{V_i}=\{T_1^{V_i}, T_2^{V_i}, \ldots, T_{n_i}^{V_i}\}$. For a short time interval $\{t_{start}, \ldots, t, \ldots, t_{end}\}$, the points from the edge (or infrastructure-based) sensors and onboard vehicle sensors are mapped or transformed to a set of unique points $P^t=\{P_1^t, P_2^t, \ldots P_m^t\}$, and each point $P_m^t \in R^k$, where k is the union of the unique dimension from both the edge (or infrastructure-based) sensors and onboard vehicle sensors. The unified perception output can thus be represented by $P^t=f(S, T^S, V_1, \ldots V_N, T^{V_1}, \ldots T^{V_N})$ and $P_m^t=(x, y, z, r, g, b, ir, doppler, \ldots )$, where x, y, and z represent spatial coordinates of an object within the homogenous coordinate system at time t, r represents red color of an object within the homogenous coordinate system at time t, g represents green color of an object within the homogenous coordinate system at time t, b represents blue color of an object within the homogenous coordinate system at time t, ir represents infrared properties or information of an object within the homogenous coordinate system at time t, and doppler represents Doppler information (e.g., Doppler shifts, speeds or velocities determined via Doppler) of an object within the homogenous coordinate system at time t. Of course other properties can be determined by the various edge and vehicle sensors, and then used as a part of the unified perception output.

Also, in some embodiments, the unified perception output can include information concerning one or more objects detected within the field of view of any one or more sensors (e.g., edge sensors, onboard vehicle sensors). Using object detection techniques at the vehicle 12 and/or at the edge node 80 (and, in some cases, at the cloud layer 20), one or more objects within a field of view of at least one sensor can be used to obtain an object list $I_t^O = \{I_{1t}^O, I_{2t}^O, \ldots, I_{nt}^O\}$ at time t and the corresponding projection of these objects to the homogenous coordinate system is $T_t^O = \{T_{1t}^O, T_{2t}^O, \ldots, T_{nt}^O\}$, where each object $I_{it}^O$ may have dimensions as (x, y, z, spped, heading, object type, size, etc.). It should be appreciated that while these physical properties are different than those discussed above with respect to the vehicles $P_m^t$, any combination of these physical properties can be used to represent information concerning the vehicle(s) and/or the one or more objects. Thus, an object list in the homogenous coordinate system can be obtained: $I_t^U = \{I_{1t}^U, I_{2t}^U, \ldots, I_{nt}^U\}$, where each object has a fixed dimension which is the union of dimensions of $I_{it}^O$. The new object list in the homogenous coordinate system for time t is: $I_t^U = f(I_{t_{start}}^O, \ldots I_{t_{end}}^O, I_{t_{start}}^U, \ldots I_{t_{end}}^U, T_{t_{start}}^O, \ldots T_{t_{end}}^O)$.

Additionally, in some embodiments, the unified perception output can include sensor information that is received from other edge nodes, such as from a neighbor edge node. This sensor information received from another edge node can be received as raw sensor data, or may be sensor data that is mapped (or transformed) to the homogenous coordinate system. Moreover, this sensor data can include data from one or more vehicles, as well as from one or more edge sensors. Once the unified perception output is generated, the method 200 continues to step 230.

In step 230, a next vehicle action is determined based on the unified perception output. A vehicle behavior system performs this step, and can include one or more devices or components of the edge layer 18 and/or the vehicle 12. The vehicle behavior system is a collection of devices and/or components from the edge layer 18 and/or the vehicle layer 16 that determines the behavior or one or more AV actions of one or more AVs within the edge cell or nearby the edge node 80. In some embodiments, the vehicle behavior system can additionally include one or more devices or components at the cloud layer 20. The vehicle behavior system can process the unified perception output to determine a next vehicle action. In many embodiments, the next vehicle action is an autonomous vehicle (AV) vehicle action, or an AV vehicle command. In one embodiment, determining the next vehicle action includes performing situational awareness to evaluate which surrounding object(s) are most relevant to the vehicle 12 and/or its AV operation. For example, using the unified perception output, the vehicle behavior system can determine which objects are present at which locations, as well as the trajectories or estimated/predicted paths of these objects (as well as other relevant physical properties). Then, these predicted paths can be processed along with a present trajectory of the vehicle 12 (e.g., as obtained via movement sensors 68 and/or GNSS receiver 46) to determine or identify which objects are most relevant in determining a next vehicle action.

Thus, in one embodiment, once physical properties of the one or more objects are known or predicted, the vehicle behavior system can evaluate certain potential vehicle actions and their predicted consequences. For example, when the host vehicle 12 is approaching the target vehicle 14 (which is traveling at a slower speed) in the same lane, the behavior system can determine whether the host vehicle 12 is to change lanes so as to pass the target vehicle 14 or whether the target vehicle 14 is planning on changing lanes so that the host vehicle 12 can remain in its lane. By using sensor information from the host vehicle 12 and the edge sensor 84 (and/or the target vehicle 14), a next vehicle action can be determined. In one embodiment, for example, the edge sensor 84 can use a camera to detect a lane change indicator (e.g., turn signal) of the target vehicle 14, which can be used to indicate that the target vehicle 14 is or plans on changing lanes. Moreover, vehicle heading and other movement information can be obtained from the target vehicle 14 and/or edge sensor(s) 84, and this information is then processed along with sensor information from vehicle 12 so as to make a determination as to the next vehicle action. In one embodiment, a next vehicle action for both the host vehicle 12 and the target vehicle 14 can be made so that these actions correspond or complement one another. In one embodiment, the vehicle action can be an AV vehicle action, such as a lane change, a deceleration, an acceleration, a maintain trajectory action, etc. In this way, the edge sensor(s) (or sensors of other vehicles) can be used to supplement the vehicle sensor data by providing sensor information from areas that are not perceivable by the host vehicle due to the vehicle's location and/or sensing capabilities.

In some embodiments, once a vehicle action is determined, the vehicle behavior system determines one or more parameters for the vehicle action. Thus, the vehicle action can be determined to be a type of vehicle action (e.g., accelerating, lane change, no trajectory change), and the one or more parameters for the vehicle action can be parameter information to be used when performing the vehicle action, such as a speed, a steering wheel angle, a braking strength, heading, etc. When the one or more parameters for the AV action are determined at the host vehicle, these parameters are referred to as "vehicle-determined AV action parameters" and the AV action is referred to as "vehicle-determined AV action." In one example, when it is determined that a lane change is to be performed, then the vehicle behavior system generates a trajectory for the host vehicle 12 to follow as well as the speed for the lane change. In one embodiment, any one or more of steps 210-230 can take into consideration information from the cloud layer 20, such as weather information and/or traffic information. For example, when the vehicle is to perform a lane change when there are icy conditions (as indicated by weather information from the cloud layer 20), the speed and/or trajectory of the lane change can be modified so as to increase safety. The method 200 continues to step 240.

In step 240, the control system executes the next vehicle action. In one embodiment, the vehicle behavior system is carried out at the vehicle, such as at the AV control unit 24. Thus, in such embodiments, for example, the next vehicle action can be used to command the AV control unit 24 to carry out the specified vehicle action. In other embodiments, the vehicle behavior system is carried out at the edge layer 18 (e.g., edge node 80) and the results are sent to the vehicle 12. These results can specify a recommended vehicle action, or may specify a vehicle command. In one embodiment, the vehicle 12 can be a low-level semi-autonomous vehicle (e.g., a level 2) and can heavily rely on edge processing for determining a next vehicle AV action. In such a case, the edge result (or the next vehicle action) can be treated as a command that instructs the vehicle to carry out the vehicle action. In another embodiment, the vehicle 12 can be a fully autonomous vehicle (e.g., level 5), and can treat the edge result as a recommended vehicle action. Thus, for example, the vehicle can further analyze sensor information to determine whether to carry out the recommended vehicle action, and/or whether to modify one or more parameters specified by the vehicle action.

In one embodiment, the AV control unit 24 uses the vehicle action from the behavior system as well as the vehicle status information to generate corresponding control signal(s), which can be sent to various electronic vehicle devices (e.g., controllers) on the vehicle to control the throttle, braking, and steering systems of the vehicle, so that the vehicle can follow the behavior command. Of course, this is only one example, as other aspects of the vehicle can be controlled as well. The method 200 then ends.

In some embodiments, the functions of the perception system and/or the behavior system can be carried out at different entities or layers (e.g., vehicle layer 16, edge layer 18, cloud layer 20) based on different requirements of the task (or vehicle action determination); timing requirements of the task that is to be performed; reliability and/or quality requirements of the task that is to be performed; computational requirements, computational capabilities, and/or present computational load of one or more devices (e.g., number of tasks/operations already determined to be performed at a particular device or layer); and vehicle information, such as the type of vehicle and/or the AV capabilities of the vehicle.

In one embodiment, the vehicle 12 is a lower level autonomous vehicle (AV), such as a level 2 vehicle. Thus, in such embodiments, the vehicle may depend more on guidance from the edge layer 18 and/or the cloud layer 20 in carrying out AV functionality (or AV actions). In another embodiment, the vehicle is a higher level autonomous vehicle (AV), such as a level 5 vehicle. In this embodiment, the vehicle may not be as dependent on guidance from the edge layer 18 and/or the cloud layer 20 in carrying out AV functionality (or AV actions), but may instead treat any input (e.g., task outputs, AV actions) as a second opinion or suggestions when determining a next AV action.

In one embodiment where the vehicle layer 16 includes at least some lower lever AVs, the system can use a hard-guaranteed scheduling process that is used to determine which node (e.g., server 78 of cloud layer 20, AV control unit 24, RSU 82) is to carry out a certain vehicle task, such as a task of determining an AV action (or information) for the vehicle 12 to carry out. In this hard-guaranteed scheduling process, the system 10 can determine a quality of service (QoS) performance level for each entity that may be allocated the vehicle task. In one embodiment, this QoS performance level can be represented as a tuple that includes reliability α, latency τ, and accuracy ε.

The QoS performance level can be predicted for the cloud layer 20, the edge layer 18, and the vehicle layer 16. In one embodiment, the following equations can be used to predict the QoS performance tuple (reliability α, latency τ, accuracy ε):

$$t_j^{(i)} = a_{(i,j)} t_j^{(i)} + b_{(i,j)} \left( \frac{w_{j,u}^{(i)}}{S_{ul}} + \frac{w_{j,d}^{(i)}}{S_{dl}} + \hat{t}_j^{(i)} \right) + c_{(i,j)} \left( \frac{w_{j,u}^{(i)}}{S_{ul}} + \frac{w_{j,d}^{(i)}}{S_{dl}} + \widehat{t'}_j^{(i)} \right) < \tau$$

$$R_j^{(i)} = a_{(i,j)} R_j^{(i)} + ((1-p) b_{(i,j)}) \hat{R}_j^{(i)} + ((1-p) c_{(i,j)}) \widehat{R'}_j^{(i)} > \alpha$$

$$e_j^{(i)} = a_{(i,j)} e_j^{(i)} + b_{(i,j)} \hat{e}_j^{(i)} + c_{(i,j)} \widehat{e'}_j^{(i)} < \varepsilon$$

where $l_j^{(i)}$ is the estimated system end-to-end latency based on different execution options (e.g., local or vehicle, cloud, and edge), $R_j^{(i)}$ is the estimated system reliability metrics based on different execution options (local, cloud, and edge), $e_j^{(i)}$ is the estimated system error or accuracy metrics based on different execution options (e.g., local or vehicle, cloud, and edge), $t_j^{(i)}$ is the time for task execution at particular execution options (local, cloud, and edge), $w_{j,u}^{(i)}$ is the amount of data that is uploaded to the cloud/edge for task execution, $w_{j,d}^{(i)}$ is the amount of data that is downloaded from cloud/edge to local vehicle after task execution is finished, $S_{uL}$ is the data rate for data uploading, $S_{dL}$ is the data rate for data downloading, p is packet drop rate in wireless communication channel, etc. In one embodiment, execution option indicator $a_{(i,j)}$ is set to 1 for local execution, execution option indicator $b_{(i,j)}$ is set to 1 for cloud execution, and execution option indicator $c_{(i,j)}$ is set to 1 for edge execution, and $a_{(i,j)}$, $b_{(i,j)}$, and $c_{(i,j)}$ can be mutually exclusive. It should also be understood that other system QoS parameters such as jitter, bandwidth, system energy consumption, etc. could be considered as a part of this evaluation, even though such parameters may rarely be used in some embodiments.

The equations above can be used to obtain a prediction of the local execution tuple ($t_j^{(i)}$, $R_j^{(i)}$, $e_j^{(i)}$), a prediction of the remote (or cloud) execution tuple ($\hat{t}_j^{(i)}$, $\hat{R}_j^{(i)}$, $\hat{e}_j^{(i)}$), and/or the edge execution tuple ($\widehat{t'}_j^{(i)}$, $\widehat{R'}_j^{(i)}$, $\widehat{e'}_j^{(i)}$). The remote execution tuple can be updated online based on the results of prior remote executions of similar tasks, such as those for the same vehicle or type of vehicle, those with similar circumstances to the present circumstances, etc. These estimates could be learnt via advanced statistical models including, but not limited to, regression analysis, factorial analysis, or Bayesian Analysis. Also, the remote execution tuple can be parameterized based on the operating environment as that is correlated to connectivity, such as by building an explicit high-dimensional multi-factor model.

Figure 4:
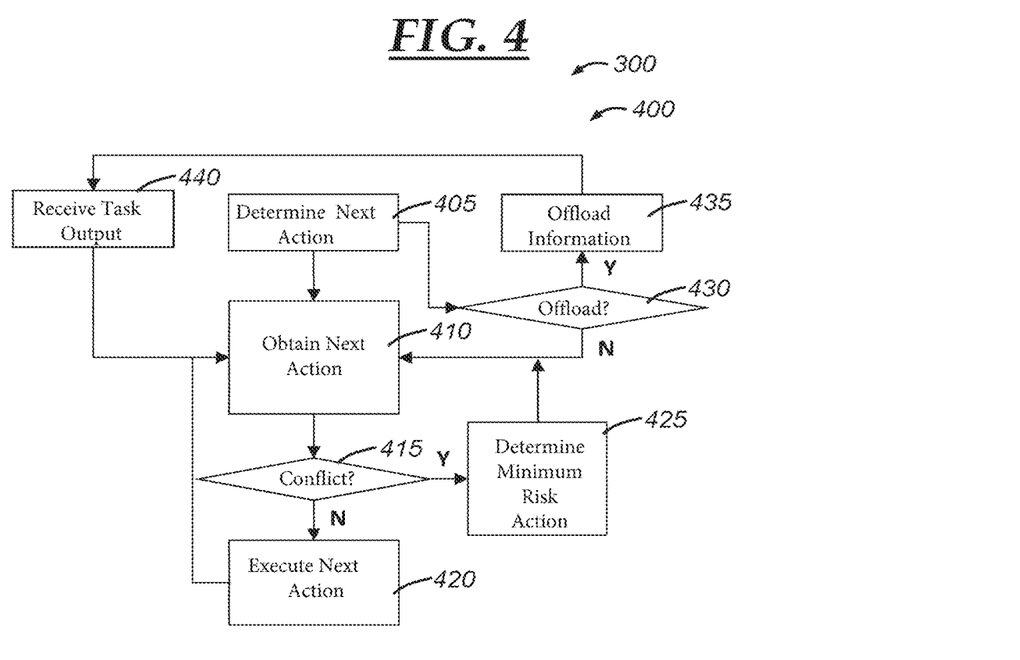
FIG. 4 is a flowchart depicting an embodiment of a process carried out by the host vehicle that is part of a method of determining an autonomous vehicle (AV) action for a host vehicle.
Figure 5:
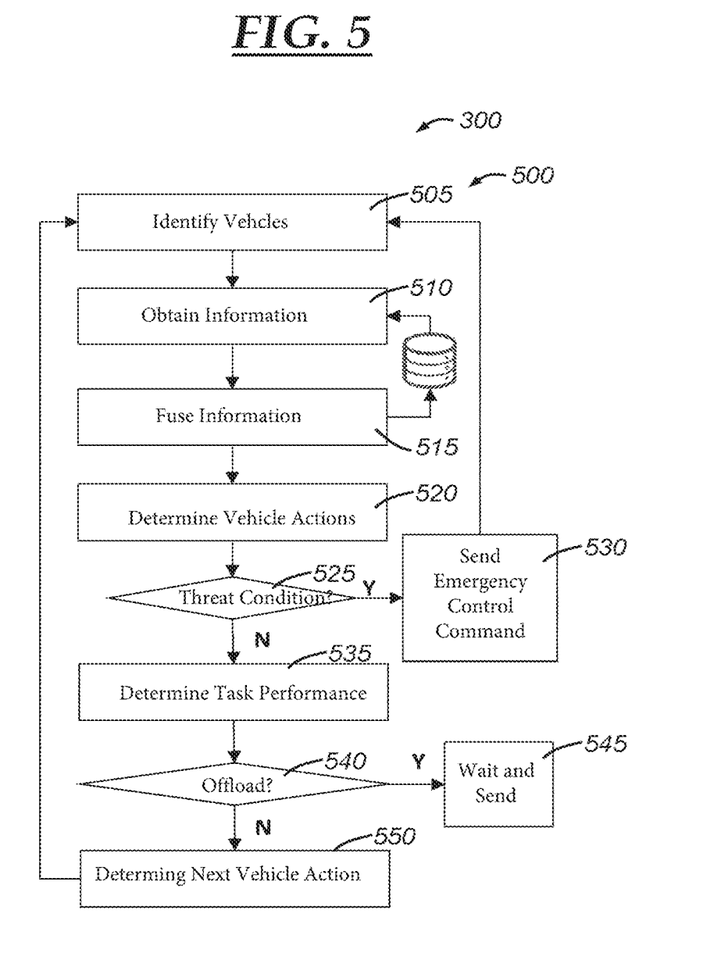
FIG. 5 is a flowchart depicting an embodiment of a process carried out by the edge node or edge layer that is part of a method of determining an autonomous vehicle (AV) action for a host vehicle.
Figure 6:
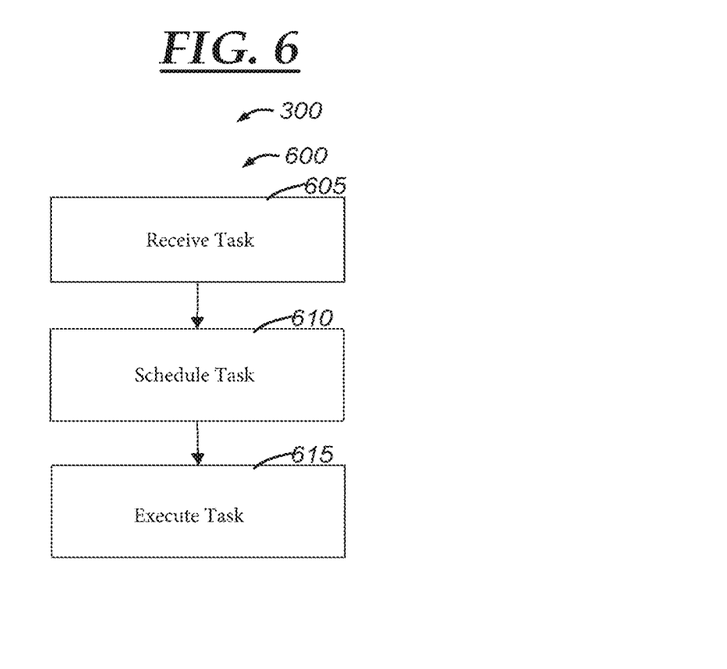
FIG. 6 is a flowchart depicting an embodiment of a process carried out by the cloud layer that is part of a method of determining an autonomous vehicle (AV) action for a host vehicle.

With reference to FIGS. 4-6, there is shown a method 300 of determining an AV action for a host vehicle, which can include any one or more of the steps from processes 400-600. FIG. 4 illustrates a process 400 that is carried out by the host vehicle 12, FIG. 5 illustrates a process 500 that is carried out by the edge layer 18, and FIG. 6 illustrates a process 600 that is carried out by the cloud layer 20. Although the steps of the processes 400-600 are described as being carried out in a particular order, it is hereby contemplated that the steps of the processes 400-600 can be carried out in any technically feasible order as will be appreciated by those skilled in the art.

In step 405, the method processes sensor information and/or other information onboard vehicle 12 to determine the next vehicle action, to determine whether to allocate one or more vehicle task(s) to the edge layer 18 or the cloud layer 20, and/or some combination thereof. This onboard processing can be carried out by the resource manager 102 and/or the processing system 104 of the vehicle 12, and can be performed based on onboard vehicle sensor data and/or information previously obtained from the edge layer 18 and/or cloud layer 20, such as a previous vehicle action and/or information representing a unified perception result from a past iteration of the method 300. For example, the onboard processing of step 405 can include making a determination as to whether to offload (i.e., allocate task(s)) to the edge layer 18 or cloud layer 20 (step 430) and, if so, certain vehicle information (e.g., sensor data from sensors 62-68, position information from GNSS receiver 46) can be sent to the edge layer 18 and/or the cloud layer 20, which is illustrated by step 435. Thus, in step 430, it is determined whether to offload vehicle information and, if so, the process 400 continues to step 435. Otherwise, the process 400 continues from step 430 to step 410.

In step 410, the next vehicle action (or command) is obtained. As discussed above with respect to FIG. 3, the next vehicle action can be obtained using the method 200 for example, which can include using a perception system and behavior system, either or both of which can be carried out by components or devices of the vehicle layer 16 and/or edge layer 18. In the case that vehicle information is offloaded (step 435), the process 400 can wait for the results (or task output) and, once the task output is received at step 440, the method 400 can continue to step 410. The process 400 continues from step 410 to step 415.

In step 415, the vehicle determines whether the commands from (or determinations made as a result of) the onboard processing conflict with commands or information received from the edge or cloud. For example, the processing system 104 of the vehicle 12 can process the onboard vehicle sensor data of the vehicle to determine a next AV action. Additionally, the edge layer 18 can provide a next vehicle task or other task output to the vehicle 12. The next vehicle task or other task output from the edge layer 18 can then be compared with the next AV action from the processing system 104 of the vehicle 12 to determine whether they are consistent with one another or whether there is a conflict. In other embodiments, this determination of step 415 can also include determining whether the commands (or task output) or other information from the edge layer 18 and/or cloud layer 20 is received in a timely manner. For example, when a next vehicle action is not received from the edge layer 18 within a predetermined amount of time (which can be selected based on the type of task and/or circumstances), then it can be determined that the process 400 is to proceed to step 425; otherwise, the process 400 continues from step 415 to step 420.

In step 425, a minimum risk action can be determined and executed by the vehicle 12. The minimum risk action is a vehicle action that is determined to meet minimum safety requirements and/or minimum performance requirements. For example, when approaching an intersection, the minimum risk action can cause the vehicle to come to a complete stop before proceeding through the intersection. The process 400 can then end or loop back for repeated execution.

In step 420, the next vehicle action is carried out or executed. This next vehicle action can be determined by the onboard processing system 104 of the vehicle 12, by the edge layer 18, or by a combination thereof. In another embodiment, the next vehicle action can also be determined or generated based on information from the cloud layer 20. This step is similar to step 240 of the method 200 (FIG. 3) discussed above and can be carried out in a like manner. The process 400 can then end or loop back for repeated execution.

With reference to FIG. 5, there is shown a process 500 that can be used as a part of the method 300, and that is carried out by the edge layer 18. In one embodiment, the process 500 can be carried out at least in part by the one or more edge node(s) 80 (including, for example, RSU(s) 82). In step 505, vehicles within the nearby area (or of the edge cell) are identified. For example, the nearby area can include a predefined geographical area constituting an edge cell associated with a particular edge node—as mentioned above, the "edge node" can refer to the hardware and/or software modules used to determine information for the "edge cell," which can refer to a particular predefined geographical area. This nearby area can include one or more roadways and can be associated with particular edge device(s), such as particular edge sensor(s) 84 and/or RSU(s) 82. Thus, in one embodiment, vehicles can be identified within the perception area (or the nearby area for that edge cell). These vehicles can include vehicle 12 and/or vehicle 14. Once the vehicles within the edge cell are identified, then a unified perception output can be determined, such as through use of the method 200. For example, onboard vehicle sensor data from vehicles 12, 14 can be received and mapped/transformed to the homogenous coordinate system. The process 500 continues to step 510.

In some embodiments, the edge may also need to get further information from the nearby edges or cloud (step 510), and then fuse all the information together to generate the perception results (step 515). Thus, in step 510, the edge node can identify neighboring edge nodes (step 510) and obtain information concerning certain objects present within neighboring edge cells. As vehicles (and other objects) may move between cells, this neighboring information can be used to better classify and determine physical properties (e.g., heading, type of object, speed, location) concerning one or more objects within the edge cell. Based on this information received from one or more neighbor edge node(s), a database or other memory structure representing information concerning these objects can be updated or modified. The process 500 continues to step 520.

In step 520, the edge node evaluates the unified perception output to determine one or more vehicle actions for one or more vehicles within the edge cell. This step can include analyzing the unified perception output and predicting future positions and/or movements of objects within the edge cell. As a part of this analysis, a threat assessment can be performed that determines probabilities of accidents or other notable events. In one embodiment, the unified perception output and/or predicted behavior or movement of object(s) can be used to assess whether a threat condition is satisfied or is likely satisfied. As illustrated in step 525, if a threat condition is satisfied or is likely satisfied, the process 500 continues to step 530 where an emergency control command is sent to the vehicle 12. This emergency control command can indicate a particular vehicle action to be carried out (e.g., based on the unified perception output), or may indicate that the vehicle is to execute a minimum risk action, such as that discussed above with respect to step 425 of the process 400 (FIG. 4). If a threat condition is not satisfied, the process 500 continues from step 525 to step 535.

In step 535, the edge node performs a resource assessment and timing analysis to determine which device, system, or layer (e.g., vehicle layer 16, edge layer 18, cloud layer 20) is to (or should) perform one or more tasks. These one or more tasks can include determining the next vehicle action and/or determining one or more properties (e.g., physical properties, including movement or spatial properties) of surrounding object(s). In one embodiment, the one or more tasks includes carrying out additional perception tasks to better estimate the properties of surrounding object(s). This resource assessment and timing analysis can be based on timing requirements of various tasks that are to be performed; reliability and/or quality requirements of various tasks that are to be performed; computational requirements, computational capabilities, and/or present computational load of one or more devices (e.g., number of tasks/operations already determined to be performed at a particular device or layer); and vehicle information, such as the type of vehicle and/or the AV capabilities of the vehicle. The process 500 continues to step 540.

When the edge node determines to offload one or more tasks to the cloud layer, the process 500 continues from step 540 to step 545; otherwise, the process 500 continues from step 540 to step 550 where the next vehicle action is determined and sent to the vehicle 12, which receives the next vehicle action (or task output) at step 410 (FIG. 4). When the process 500 continues to step 545, the process 500 can wait for the task output from the cloud layer 20 and, then, can process and send the output to the vehicle 12. In one embodiment, the offloaded task can simply be a request for certain information that is to be used by the edge node in carrying out one or more vehicle tasks, such as determining the next vehicle action. Once the edge node receives the results from the cloud layer 20, then the edge node can determine the next vehicle action (or task output) and provide this output to the vehicle 12. In other embodiments, the edge node can inform the cloud layer 20 of the vehicle that is to receive the results so that the results can be provided to the directly from the cloud layer 20 to the vehicle 12. The process 500 then ends or continues back for repeated execution.

With reference to FIG. 6, there is shown a process 600 that can be used as a part of the method 300, and that is carried out by the cloud layer 20. In one embodiment, the process 600 can be carried out at least in part by the computer(s) 78. In step 605, a task is received from the edge node and/or from a vehicle (e.g., vehicle 12). Then, in step 610, the task can be scheduled based on certain requirements regarding the task, such as based on latency requirements for the particular task. Then, according to the schedule, the tasks are executed, which can include processing various information received from the vehicle(s) and/or edge node(s) (e.g., sensor information, unified perception result). Once the task output is obtained, the output is then sent back to the requestor, which may be the vehicle 12 and/or the edge node of the edge layer 18. In other embodiments, a different device other than the requestor (i.e., the device/system requesting the task) can be specified and the task output can then be provided accordingly. The process 600 then ends or continues back for repeated execution.

Any one or more of the processors discussed herein can be any type of device capable of processing electronic instructions including microprocessors, microcontrollers, host processors, controllers, vehicle communication processors, General Processing Unit (GPU), accelerators, Field Programmable Gated Arrays (FPGA), and Application Specific Integrated Circuits (ASICs), to cite a few possibilities. The processor can execute various types of electronic instructions, such as software and/or firmware programs stored in memory, which enable the module to carry out various functionality. Any one or more of the memory discussed herein can be a non-transitory computer-readable medium; these include different types of random-access memory (RAM), including various types of dynamic RAM (DRAM) and static RAM (SRAM)), read-only memory (ROM), solid-state drives (SSDs) (including other solid-state storage such as solid state hybrid drives (SSHDs)), hard disk drives (HDDs), magnetic or optical disc drives, or other suitable computer medium that electronically stores information. Moreover, although certain electronic vehicle devices may be described as including a processor and/or memory, the processor and/or memory of such electronic vehicle devices may be shared with other electronic vehicle devices and/or housed in (or a part of) other electronic vehicle devices of the vehicle electronics—for example, any of these processors or memory can be a dedicated processor or memory used only for module or can be shared with other vehicle systems, modules, devices, components, etc.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps is just one possibility, as the present method may include a combination of steps that has fewer, greater or different steps than that shown here. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation. In addition, the term "and/or" is to be construed as an inclusive or. As an example, the phrase "A, B, and/or C" includes: "A"; "B"; "C"; "A and B"; "A and C"; "B and C"; and "A, B, and C."

The invention claimed is:

1. A method of determining an autonomous vehicle (AV) action for a host vehicle, the method comprising the steps of:
obtaining onboard vehicle sensor data from at least one onboard vehicle sensor, the onboard vehicle sensor is a part of vehicle electronics of the host vehicle;
obtaining edge sensor data from at least one edge sensor, the edge sensor is a part of an edge layer of a roadside unit;
fusing the edge sensor data and the vehicle sensor data using data projection to provide fused data in a homogenous coordinate system;
generating a unified perception output based on the fused data;
determining an AV action for the host vehicle based on the unified perception output; and
providing the AV action to the host vehicle, wherein the host vehicle is configured to carry out the AV action.

2. The method of claim 1, wherein the generating step further includes generating the unified perception output with an edge node of the edge layer.

3. The method of claim 1, wherein an edge sensor data projection $T^s$ is generated using the edge sensor data as a part of the transforming step, the edge sensor data is represented as $S=\{s_1, s_2, \ldots, s_{ns}\}$, the edge sensor data projection is represented as $T^S=\{T_1^S, T_2^S, \ldots, T_{ns}^S\}$, and wherein the edge sensor data projection includes or represents the edge sensor data within the homogenous coordinate system.

4. The method of claim 3, wherein an onboard vehicle sensor data projection $T^{V_i}$ is generated using the onboard vehicle sensor data as a part of the transforming step, the onboard vehicle sensor data is represented as $V_i=\{v_{i1},$ $v_{i2}, \ldots, v_{in_i}\}$, the onboard vehicle sensor data projection is represented as $T^{V_i}=\{T_1^{V_i}, T_2^{V_i}, \ldots, T_{n_i}^{V_i}\}$, and wherein the onboard vehicle sensor data projection includes or represents the onboard vehicle sensor data within the homogenous coordinate system.

5. The method of claim 4, wherein the unified perception output includes a set of unique points $P=\{P_1^t, P_2^t, \ldots P_m^t\}$, and wherein the set of unique points includes or represents the edge sensor data projection $T^S$ and the onboard vehicle sensor data projection $T^{V_i}$.

6. The method of claim 5, wherein the set of unique points P includes onboard vehicle sensor data from one or more nearby vehicles other than the host vehicle.

7. The method of claim 2, wherein the method is carried out by the edge node, the edge node includes a processor, memory, and a wireless communications device, the edge node is communicatively coupled to the edge sensor, and the wireless communications device communicates with one or more nearby vehicles, including the host vehicle.

8. The method of claim 7, wherein the generating step further includes gathering geographical and/or spatial information regarding static objects from the edge node memory, and generating the unified perception output so as to include the geographical and/or spatial information, wherein the static objects are within an edge cell corresponding to the edge node.

9. The method of claim 1, wherein the method further comprises the step of determining whether to allocate one or more computational tasks relating to the determination of the AV action to a cloud layer and, when it is determined to allocate one or more computational tasks relating to the determination of the AV action to the cloud layer, sending task information to a cloud device of the cloud layer.

10. The method of claim 9, wherein the host vehicle is further configured to determine whether the AV action conflict with a vehicle-determined AV action and, if so, to carry out a minimum risk action.

11. The method of claim 1, wherein the unified perception output includes object information concerning one or more objects within a field of view of the at least one onboard vehicle sensor or the at least one edge sensor, and wherein the object information of the unified perception output is generated based on object detection techniques.

12. The method of claim 1, wherein the host vehicle is configured to determine whether to allocate an AV-related task to an edge node of the edge layer, and wherein the edge node carries out the method steps and provides the AV action to the vehicle in response to completing the AV-related task.

13. A method of determining an autonomous vehicle (AV) action for a host vehicle, the method comprising the steps of:
obtaining onboard vehicle sensor data from at least one onboard vehicle sensor, the onboard vehicle sensor is a part of vehicle electronics of the host vehicle;
obtaining onboard vehicle sensor data from one or more other vehicles;
obtaining edge sensor data from an edge sensor of an edge layer of a roadside unit determining whether to allocate a vehicle task to the edge layer of the roadside unit;
when it is determined to allocate the vehicle task to the edge layer, sending the onboard vehicle sensor data from the host vehicle to an edge node of the edge layer, wherein the edge node is configured to:
fuse at least two of the onboard vehicle sensor data of the host vehicle, the onboard vehicle sensor data of the one or more other vehicles, and edge sensor data using data projection to provide fused sensor data in a homogenous coordinate system;
determine a unified perception output based on the fused sensor data;
perform the vehicle task based on the unified perception output to obtain a vehicle task output; and
send the vehicle task output to the host vehicle;
receiving the vehicle task output at the host vehicle from the edge node; and
carrying out an AV action based on the vehicle task output at the host vehicle.

14. The method of claim 13, wherein the vehicle electronics includes short-range wireless communications (SRWC) circuitry, and wherein the sending the onboard vehicle sensor data step is carried out using the SRWC circuitry.

15. The method of claim 13, wherein the determining step includes carrying out a hard-guaranteed scheduling process, and wherein the host vehicle is a low-level autonomous vehicle.

16. The method of claim 15, wherein the hard-guaranteed scheduling process includes determining a quality of service (QoS) performance level, and wherein the QoS performance level includes a system reliability metric, a system accuracy metric, and a system end-to-end latency metric.

17. The method of claim 13, wherein the edge node is further configured to determine whether to allocate the vehicle task or part of the vehicle task to a cloud layer and, when it is determined to allocate the vehicle task or part of the vehicle task to the cloud layer, then sending an indication to a cloud device of the cloud layer to perform the vehicle task or part of the vehicle task.

18. The method of claim 13, wherein the vehicle task output indicates the AV action along with at least one AV parameter, and wherein the vehicle carries out the AV action according to the at least one AV parameter using an AV control unit of the vehicle electronics.

19. An autonomous vehicle (AV) perception system, comprising:
an edge layer that includes at least one edge node and at least one edge sensor of a roadside unit, the edge sensor is communicatively coupled to the at least one edge node, and the at least one edge node includes a processor, memory communicatively coupled to the processor, and a wireless communications device that is communicatively coupled to the processor; and
a vehicle layer that includes a host vehicle, the host vehicle includes at least one onboard vehicle sensor, a wireless communications device, and an AV control unit;
wherein the edge layer and the vehicle layer are configured to:
obtain onboard vehicle sensor data from the at least one onboard vehicle sensor of the host vehicle;
obtain edge sensor data from the at least one edge sensor of the edge layer;
generate a unified perception output based on a fusing of the onboard vehicle sensor data and the edge sensor data using data projection;
determine an AV action for the host vehicle based on the unified perception output; and
provide the AV action to the host vehicle, wherein the host vehicle is configured to carry out the AV action using the AV control unit.

* * * * *